W. J. MENZIES,

Assignor of one-half to G. T. LEWIS.

GRINDING AND SIEVING CAUSTIC ALKALI.

No. 10,109. Reissued May 9, 1882.

WITNESSES:

William H. Sonneborn

John W. O'Brien

INVENTOR

William J. Menzies

BY

John R. Bennett

ATTORNEY

N. PETERS, Photo-Lithographer, Washington, D. C.

UNITED STATES PATENT OFFICE.

WILLIAM J. MENZIES, OF SAINT HELEN'S, COUNTY OF LANCASTER, ENGLAND, ASSIGNOR OF ONE-HALF TO GEORGE T. LEWIS, OF PHILADELPHIA, PENNSYLVANIA.

GRINDING AND SIEVING CAUSTIC ALKALI.

SPECIFICATION forming part of Reissued Letters Patent No. 10,109, dated May 9, 1882.

Original No. 243,939, dated July 5, 1881. Application for reissue filed April 12, 1882. Patented in England October 21, 1879.

DIVISION B.

*To all whom it may concern:*

Be it known that I, WILLIAM JONES MENZIES, a British subject, residing at Saint Helen's, in the county of Lancaster, England, have invented certain new and useful Improvements in Grinding and Sieving Caustic Alkalies and in Apparatus therefor, (for which I have received Letters Patent in England, No. 4,274, dated October 21, 1879;) and I do hereby declare that the following is a full, clear, and exact description of the invention, which will enable others skilled in the art to which it appertains to make and use the same.

In grinding caustic alkalies great difficulty is experienced, owing to their deliquescent nature, and annoyance experienced from the fearfully corrosive dust flying about. This has hitherto almost prevented these chemicals being ground to a commercial extent, though they are vastly more convenient if finely and evenly comminuted. I find, however, that by grinding or crushing caustic alkalies while hot the deliquescence is not perceptible, and by grinding or crushing and immediately sieving in a close mill the dust nuisance is minimized. I melt the caustic alkalies and pour them onto suitable plates, and when consolidated, but still at a high temperature—sufficiently high to prevent any perceptible deliquescence—grind and sieve the same by passing them through a suitable mill; or, if the caustic alkalies have been allowed to cool, they may be ground and sieved by heating the mill or the atmosphere through which they pass to a temperature sufficiently high to prevent any perceptible deliquescence—as if the caustic alkalies were hot—by steam-pipes or other well-known mechanical means for applying heat. In grinding and sieving the caustic alkalies I use preferably an ordinary grinding and sieving clay-mill, but covered in below with a stationary bottom underneath, and scraper moving around upon it and scraping the sieved and powdered alkali (which has fallen through the sieve-plates above onto the bottom of the closed chamber below) out through apertures at the bottom into the barrel placed underneath, as shown in the annexed drawings, in which—

Figure 1:
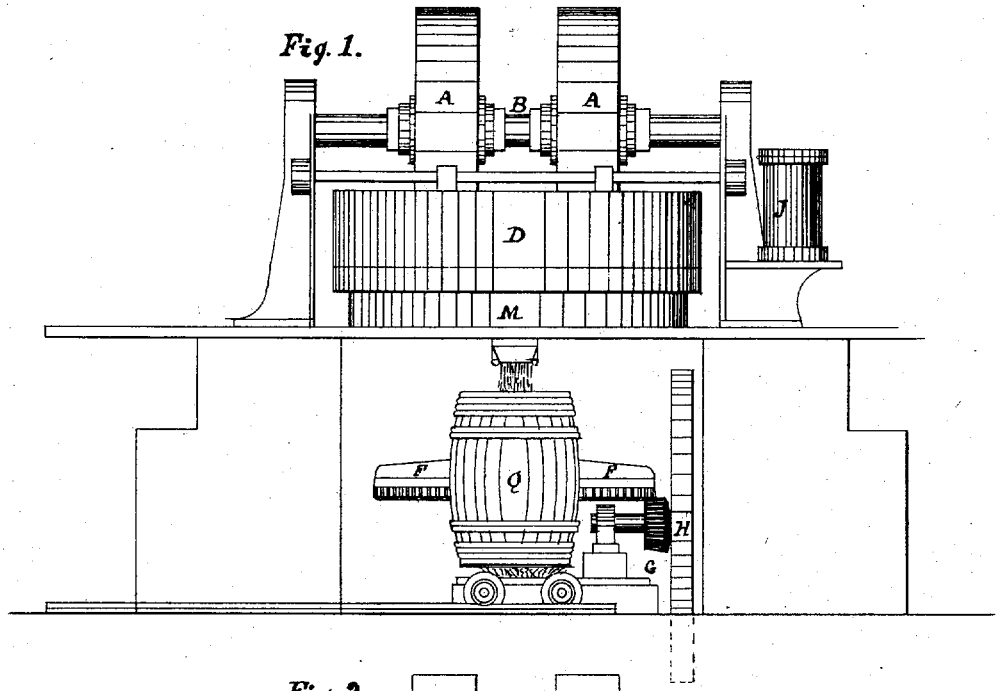
Figure 2:
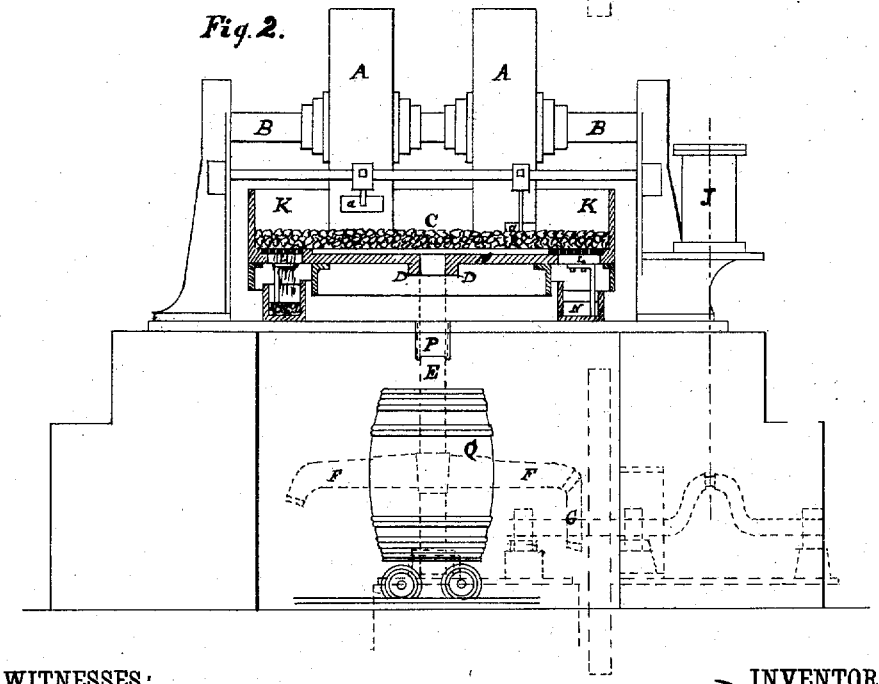

Figure 1 is an elevation, and Fig. 2 a section, of my improved apparatus.

A A are the grinding-rollers, as in an ordinary mortar or clay mill; B, shaft carrying same; *a a*, scrapers bearing against periphery of rollers A A; C, steel or other hard plate carried by cast-iron pan D, which latter is keyed to shaft E and rotated by bevel-gearing F G, fly-wheel H, crank I, and engine J; K, walls of pan; L, grating; M, stationary bottom; N, scrapers scraping the finely powdered and sieved caustic that falls on the sheet in bottom M into spout T in said bottom, through which the powder falls into a barrel, Q, preferably placed on a trolley, as shown.

Many other forms of combined sieve and grinder will do, so long as the sieving immediately follows the grinding and the caustic alkalies are ground hot, or the mill and apparatus or atmosphere in connection with or surrounding the same is sufficiently heated by steam-pipes or other suitable means for applying the heat.

In actual practice I use caustic sufficiently hot and guard it from currents of air and pass through such a quantity in such a manner as to avoid having to heat the mill with steam-pipes, &c.; but, if desirable, the pan could be made hollow and steam be made to circulate between the plates, or steam-pipes could be laid in the circular trough or bottom M. It will be seen, too, that, as represented, the rotation of the pan causes the rollers to revolve. If desirable, independent driving apparatus could be applied to the rollers, so as to cause them to rotate at a different surface speed to that of the pan.

Having now described my invention, what I claim is—

Dry ground or powdered caustic alkali, as herein described.

In testimony of which invention I have hereunto set my hand.

WILLIAM J. MENZIES.

Witnesses:
LISLE STOKES,
R. S. CHILD, Jr.